(12) United States Patent
English (10) Patent No.: US 6,901,887 B2
(45) Date of Patent: Jun. 7, 2005

(54) PACKAGE WATER TUBLE BOILER HAVING TWO OFFSET DRUMS

(76) Inventor: John R. English, 7072 Covebrook La., Mechanicsville, VA (US) 23116-4833

( * ) Notice: Subject to any disclaimer, the term of this patent is extended or adjusted under 35 U.S.C. 154(b) by 92 days.

(21) Appl. No.: 10/702,886

(22) Filed: Nov. 6, 2003

(65) Prior Publication Data

US 2004/0094100 A1 May 20, 2004

Related U.S. Application Data

(60) Provisional application No. 60/424,908, filed on Nov. 8, 2002.

(51) Int. Cl.[7] ............................................... F22B 15/00
(52) U.S. Cl. .................................. 122/331; 122/235.19
(58) Field of Search ....................... 122/235.19, 235.21, 122/235.31, 235.11, 331, 351, 358

(56) References Cited

U.S. PATENT DOCUMENTS

| | | |
|---|---|---|
| 477,880 A | 6/1892 | Wojan |
| 1,790,593 A * | 1/1931 | Nelis ........................... 122/331 |
| 2,333,644 A * | 11/1943 | Ebbets ......................... 122/336 |
| 2,648,316 A | 8/1953 | Marshall |
| 5,881,551 A | 3/1999 | Dang |

OTHER PUBLICATIONS

The Babcock & Wilcox Company, Steam/Its Generation and Its Use (40th ed.) (book), 1992, pp. 25–28 and 25–29.
Combustion Engineering, Inc., Combustion Fossil Power, (4th ed.) (book), 1991, pp. 8–36 to 8–42.
Zurn Industries, Inc., Keystone Steam Generating Systems (brochure), 1978, pp. 1–7.
The Bigelow Company, Type A Boiler (brochure), date unknown.*
English Boiler, Inc., A New Generation of Boilers/"S"—Type Boiler (brochure), Nov. 30, 2001.**

* cited by examiner

Primary Examiner—Gregory Wilson
(74) Attorney, Agent, or Firm—Robert C. Lyne, Jr.

(57) ABSTRACT

A package water tube boiler has offset upper and lower steam and water drums located adjacent its opposite side walls, with a generally square combustion chamber between the drums. Connecting the drums are generally L-shaped riser and downcomer tubes including convection tubes and radiant tubes extending in vertical and horizontal runs along the sides, top, and bottom of the combustion chamber. The tubes, especially the inboard radiant tubes, are configured, and their entrances and exits to and from the drums are located, so as to permit increased efficiency and steam generation capacity without increasing the package boiler's outside dimensions, to shield the drums from thermal radiation emanating from the combustion chamber, to locate the boiler's center of gravity equidistant from its side walls, and to fix the upper drum to and support it by the boiler's end walls. Preferably, the relationships between the radiant tubes and the upper drum are such that the inboard radiant tubes in their generally horizontal run extend past the vertical plane including the drum's longitudinal axis by a distance of at least 60% of the drum's radius, the inboard radiant tubes bend in an acute angle just before entering the drum, the distance between the inboard radiant tubes and the drum are substantially less than the drum's radius, and the entrances of the radiant tubes in the drum are spaced radially from those of the convection tubes.

18 Claims, 4 Drawing Sheets

PACKAGE WATER TUBLE BOILER HAVING TWO OFFSET DRUMS

RELATED APPLICATION

This application discloses and claims subject matter which was disclosed in copending provisional patent application Ser. No. 60/424,908, filed Nov. 8, 2002 and titled Package, Two-drum, Water-tube Boiler.

TECHNICAL FIELD

This invention pertains to package (i.e., "shop-assembled") water tube boilers for generating hot water or steam and, more particularly, to such boilers which have only two drums—a lower drum and an upper drum. The lower drum is the water drum, which is sometimes called the "mud" drum. In a hot water generating boiler, the upper drum is a hot water drum. In a steam-generating boiler, the upper drum is a steam-and-water drum or "steam" drum. (As used herein, the term "boiler" is used in its generic sense, and is not limited to a device that heats water above its boiling point or to a vessel or combination of vessels which contain only fluid. The term embraces, as well as both a hot water generator and a steam generator, a complete generating unit thereof, as could include for example a furnace, insulation, hardware, and accessories.)

Package boilers are assembled in a factory and, in most cases, have a weight and exterior dimensions that comply with the maximum limitations for shipment by truck and/or rail. When neither truck nor rail transportation is necessary, however, less stringent weight and dimensional limitations may apply; examples include package boilers shipped by water vessel or used for propulsion of a water vessel. Field-erected boilers, in contrast with package boilers, are assembled at the operating site from components and materials shipped to the site.

BACKGROUND ART

Boilers are required in many applications, worldwide, for the production of hot water and saturated and superheated steam. Hot water has numerous applications, including space heating with central boilers. Saturated steam is primarily used for process steam, heating, and air conditioning, whereas superheated steam is primarily used in steam turbine applications for the generation of electrical power. A typical boiler consists of three heat absorbing sections: a radiant section, a convective section, and possibly a superheater section. The radiant section is the heat transfer surface area exposed to the flame in the combustion chamber (sometimes called the "furnace" or the "firebox"), whereas the convective section is the heat transfer surface area shielded from the flame, but excluding any superheater. The radiant section and the convection section each comprise riser tubes connecting the water drum to the steam drum. The superheater section is located in either the high temperature section of the boiler convection section or at the rear of the boiler. Saturated steam generated in the radiant and convective sections of the boiler is collected in the steam drum and then, at the saturation pressure and temperature, is transferred to the superheater section of the boiler, where it is raised to a higher temperature while remaining at approximately constant pressure.

The oxidization of a fuel in the combustion chamber of a boiler generates thermal energy that is transferred to the water in the various sections of the boiler and thereby creates the steam that is generated inside the radiant and convective sections. The efficient conversion of the energy in the fuel into steam is of practical importance, as is the cost of the boiler system.

A fundamental advantage of package boilers is an installed cost which is considerably lower than that of a field-erected boiler. This cost advantage is made possible by basic designs that allow standardized processes for fabricating multiple units in a factory, while providing sufficient flexibility to permit straightforward, efficient, and technically sound adaptation to the specific needs of a particular application.

The configuration of the tubes connecting the lower drum to the upper drum is especially important in a package boiler. These tubes must not only convey saturated steam and water to the upper drum, but must also liberally cool the furnace and the walls in order for the boiler to have its small size. This is critical in a package boiler because the space available for insulation is limited.

Package boilers are described in various publications and patents. These include *Steam/Its Generation and Use* ($40^{th}$ edition), published in 1992 by The Babcock and Wilcox Company, at pages 25-8 and 25-9; *Combustion Fossil Power* ($4^{th}$ edition), published in 1991 by Combustion Engineering, Inc. (especially pages 8–36 to 8–42); *Keystone Steam Generating Systems*, a brochure published in 1978 by Zurn Industries, Inc. (especially pages 1 to 7); *Type A Boiler*, a brochure published by The Bigelow Company of Madison, Conn.; and Dang U.S. Pat. No. 5, 881,551 (especially column 1, lines 35 to 65).

These references show various basic configurations for the tubes connecting the lower drum (or drums) and the upper drum. *Steam/Its Generation and Use, Combustion Fossil Power*, and the Dang patent disclose D-type, two-drum boilers, in which the upper drum is located directly above the lower drum adjacent one side wall of the boiler. (As used herein, "two-drum" means having two drums and only two drums.) D-type boilers are not symmetrical and thus are inherently unbalanced, due to the heavier weight of the drums on one side relative to the weight of the tubes on the other side. Consequently, transporting a D-type package boiler requires the addition of counterweights, or shifting the boiler laterally on the transporting vehicle, to bring the center of gravity of the load to the center of the truck, railcar, barge, or other vehicle. *Combustion Fossil Power* also discloses an A-type, three-drum package boiler, in which the upper drum is located above and midway between two lower drums adjacent opposite side walls of the boiler, stating "Its symmetry makes the A design ideal for rail shipment because ballast is not needed. This simplifies off-loading and handling". The Bigelow brochure discloses another A-type boiler. The Zurn brochure discloses an O-type package boiler, in which the upper drum is located directly above the lower drum midway between the side walls of the boiler. While O-type boilers are symmetrical and thus inherently balanced, the arrangement of the drums tends to limit the height of the combustion chamber. Also, in A-type and O-type boilers two symmetric arrays of tubes enter opposite sides of the upper drum, which precludes optimum location of the entrances of the tubes, particularly the radiant tubes, radially about the drum. Moreover, it will be understood that the respective basic tube configurations also have numerous other characteristics which positively or negatively affect boiler design and/or performance.

The prior art also discloses offset, two-drum, field-erected boilers in which the lower drum is on one side of the boiler and the upper drum is on the other side. These include Wojan U.S. Pat. No. 477,880 and Marshall U.S. Pat. No. 2,648,316. In these boilers the tubes connecting the drums pass between the combustion chamber and the upper drum to permit the tubes to enter the drum at entrances spaced uniformly about the lower half of the drum, which limits the ability of their tube configurations to take advantage of the offset two-drum concept. The same is true of the package boilers described in the English Boiler, Inc. brochure "*A New Generation of Boilers/'S'-Type Boiler*", prepared Nov. 30, 2001.

SUMMARY OF THE INVENTION

The present invention resides in the riser tube configuration of package water tube boilers having two offset drums. In these configurations, the major distinctions are the locations, paths, and shapes of the tubes and the locations of their entrances to the steam drum, as viewed in transverse cross-section.

An object of the invention is to use radiant tubes to shield the upper drum from substantially all of the flame in the combustion chamber. This eliminates the need for insulation between the flame and the upper drum and increases the heat transfer surfaces of both the upper drum and the radiant tubes.

Another object of the invention is to place the center of gravity of the boiler at the midpoint of its width, equidistant from the outer surfaces of its side walls. This enables the boiler to be shipped without the need for any ballast or counterweight, and without the need to move the boiler laterally on the platform of the shipping vehicle to align the boiler's center of gravity with the midpoint of the platform, which would reduce the maximum permissible width of the boiler that can be shipped.

Another object of the invention is to separate the entrances of the radiant tubes to the steam drum from the entrances of the convection tubes to the steam drum, thereby smoothing the flow of the steam vapor and water mixture from the riser tubes into the steam drum, reducing foaming and turbulence in the mixture, increasing the mass of water below the surface of the mixture in the drum, more completely disengaging the steam from the water, and enhancing stability and control of the level of the mixture.

Another object of the invention is to maximize the heat transfer area for a given total boiler volume (as determined by its exterior dimensions).

Another object of the invention is to maximize the steam generation capacity (as measured for example in pounds per hour) for a given total boiler volume.

Another object of the invention is to optimize the width and height of the combustion chamber by making them approximately equal, so that the transverse cross-section of the combustion chamber is approximately square. This enables the combustion chamber to better conform to the shape of the flame, thereby facilitating control and reducing NOx emissions.

Another object of the invention is to achieve the objects stated above, or as many of them as possible and to the greatest extent possible, at the lowest possible cost in materials, labor, shipping, fuel, and operation.

The drawings show the boiler approximately to scale, except that thicknesses of some relatively thin components have been exaggerated. For purposes of using the drawings for approximate measurements, the actual length, width, and height of the exterior of the boiler shown are 5.4 meters, 3.8 meters, and 2.6 meters.

DESCRIPTION OF THE PREFERRED EMBODIMENT

Figure 1:
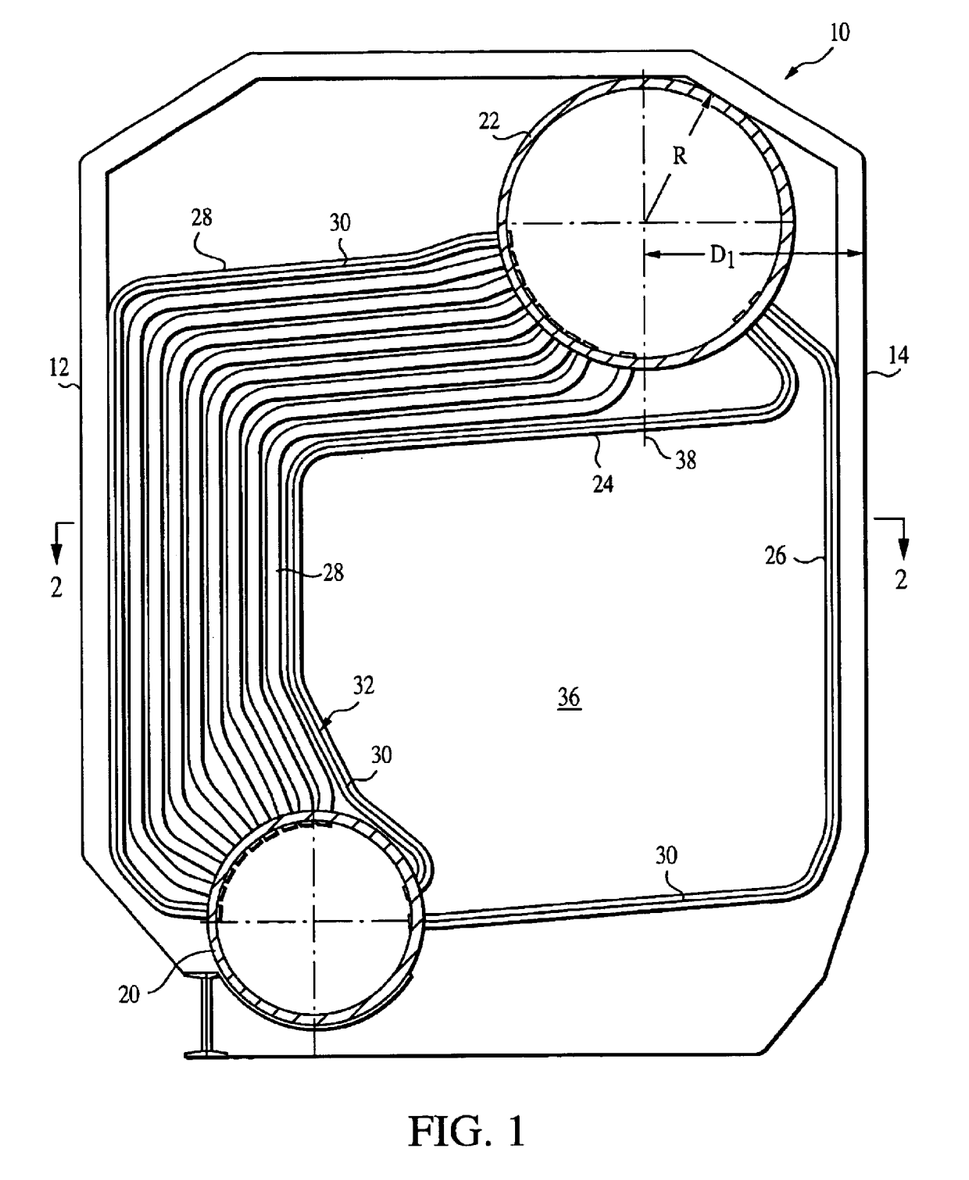
FIG. 1 is an elevation view of a transverse section of a boiler according to the invention, taken at 1—1 in FIG. 2.
Figure 2:
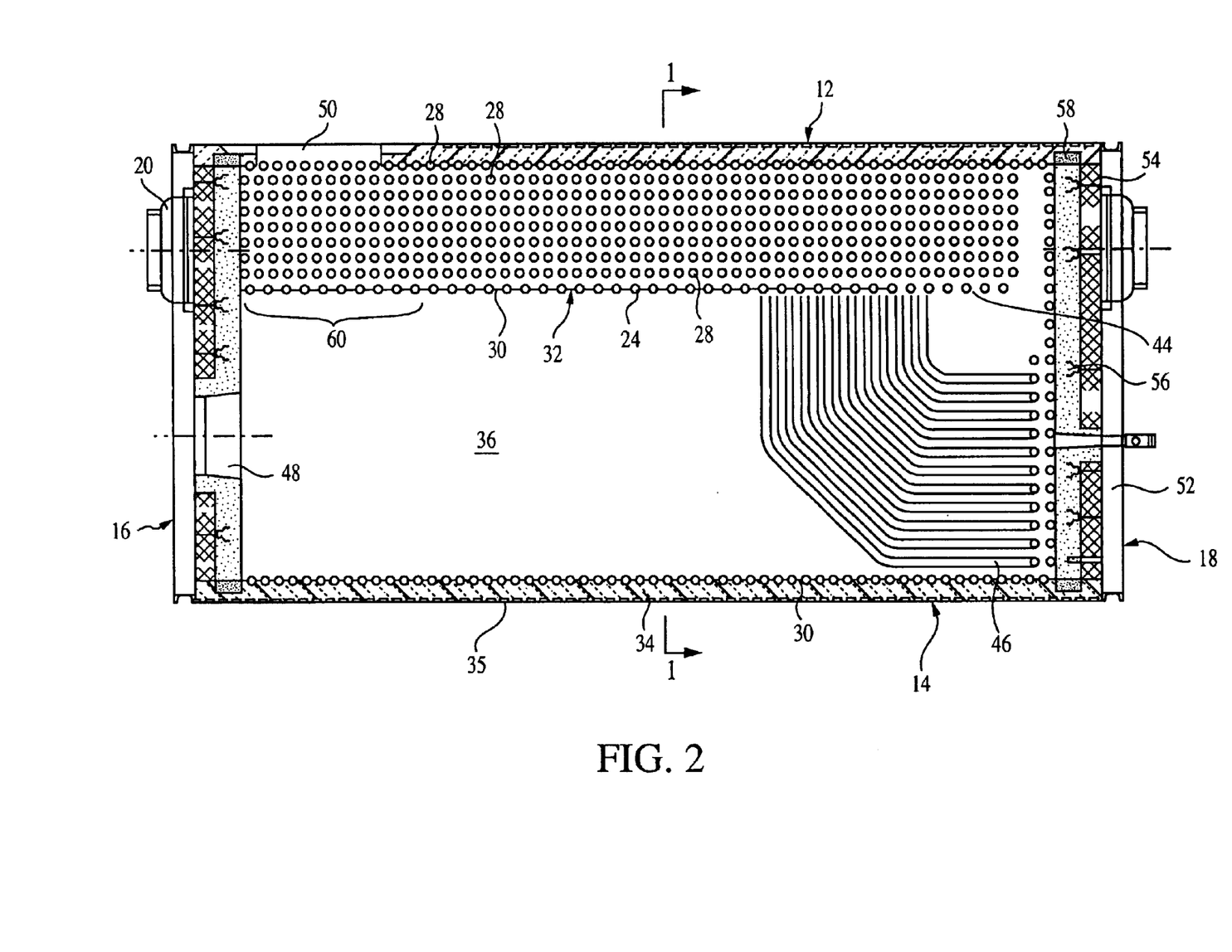
FIG. 2 is a plan view of a lengthwise section of the boiler, taken at 2—2 in FIG. 1.

FIGS. 1 and 2 show package, water tube boiler 10 having side walls 12, 14 connected to end walls 16, 18 in a rectangular configuration. Side walls 12, 14 are substantially longer than end walls 16, 18. Steel water drum 20 is located in a lower corner, while steel steam drum 22 is located in the opposite, upper corner. Steam drum 22 has an outer radius of R, and its longitudinal axis is spaced from the outer surface of side wall 14 by distance $D_1$. The offset drums are connected to each other by steel water tubes, which consist of inboard radiant riser tubes 24, outboard radiant riser tubes 26, and a bank of convection riser tubes 28. Transverse cross-sections taken at locations different from FIG. 1 would be essentially identical to FIG. 1; that is, the tubes shown in FIG. 1 are individual tubes in one "row" of horizontal, generally L-shaped "columns" of tubes extending parallel to the drums, both away from and toward the viewer. There are eleven such columns shown—one column of inboard radiant tubes 24, one column of outboard radiant tubes 26, and nine columns of convection tubes 28. Adjacent rows of inboard radiant tubes 24 are connected to each other by welded steel fins 30 to form a membrane division wall or baffle wall 32 separating the radiant section and the convection section. Adjacent rows of outboard radiant tubes 26 are also connected together by welded fins 30 to form a membrane wall which, with mineral wool insulation 34 and an outer skin of ribbed metal sheet 35 (shown in FIG. 2), constitute side wall 14. Similarly, adjacent rows of the convection tubes 28 in the outermost column (the column of convection tubes 28 most distant from inboard radiant tubes 24) are connected together by welded fins to form a membrane wall which, with mineral wool insulation and an outer skin of ribbed metal sheet, constitute side wall 12.

As best shown in FIG. 1, baffle wall 32 and side wall 14 define combustion chamber 36, which is located generally between water drum 20 and steam drum 22. Preferably combustion chamber 36 is approximately square.

Figure 3:
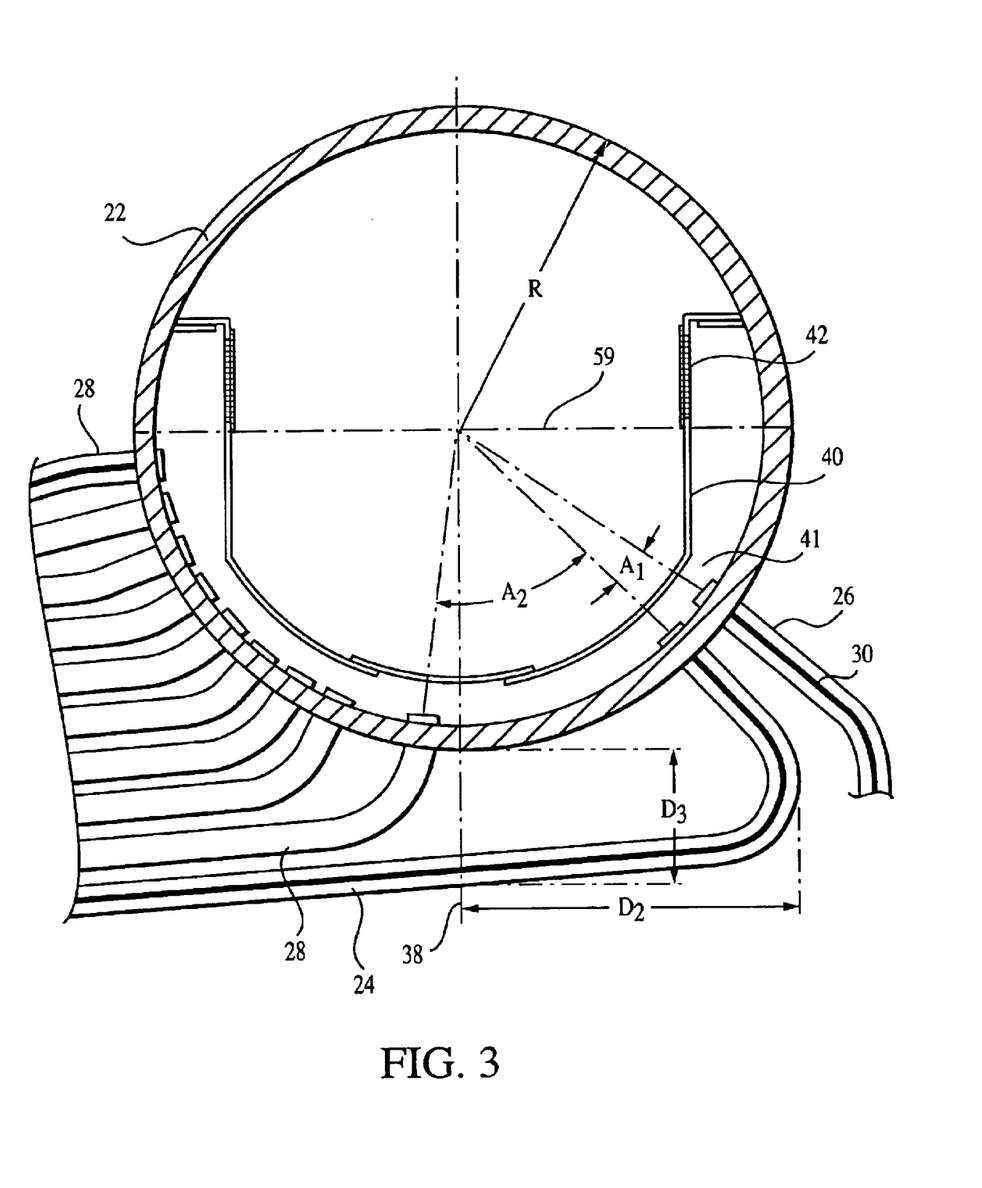
FIG. 3 is an enlarged view of the steam drum as shown in FIG. 1.

Inboard radiant tubes 24 extend from exits in water drum 20, upward in a vertical run along the side of combustion chamber 36 which is closer to the side wall 12, then laterally toward side wall 14 in a generally horizontal run along the top of combustion chamber 36 at a height below steam drum 22 and passing through imaginary vertical plane 38 including the longitudinal axis of steam drum 22, then upward in an acute angle of approximately 50 degrees, and then to entrances in steam drum 22. As shown in FIG. 3, inboard radiant tubes 24 extend past vertical plane 38 by a substantial distance $D_2$. In the configuration depicted, $D_2$ is approximately 96% of R. In plane 38, the lower surfaces of inboard radiant tubes 24 are spaced from the bottom of steam drum 22 by a distance $D_3$. In the configuration depicted, $D_3$ is approximately 42% of R. Outboard radiant tubes 26 extend from exits in water drum 20, laterally toward side wall 14 in a generally horizontal run along the bottom of combustion chamber 36, then upward in a vertical run along the side of combustion chamber 36 which is closer to side wall 14, and then to entrances in steam drum 22. Convection tubes 28 extend from exits in water drum 20, upward in a vertical run adjacent the vertical run of inboard radiant tubes 24, then laterally in a generally horizontal run above the generally horizontal run of inboard radiant tubes 24, and then to entrances in steam drum 22.

As best shown in the cross-section of FIG. 3, the tubes do not enter steam drum 22 at uniformly spaced entrances. Instead, the entrances of the radiant tubes are separated from the entrances of the convection tubes, for reasons which will be set forth more fully below. The entrances of inboard radiant tube 24 and outboard radiant tube 26 are at an angle $A_1$, while the entrances of inboard radiant tube 24 and the nearest convection tube 28 are at an angle $A_2$. In the configuration depicted, $A_1$ is approximately 10 degrees, $A_2$ is approximately 55 degrees, and $A_1$ is approximately 25% of $A_2$.

Figure 4:
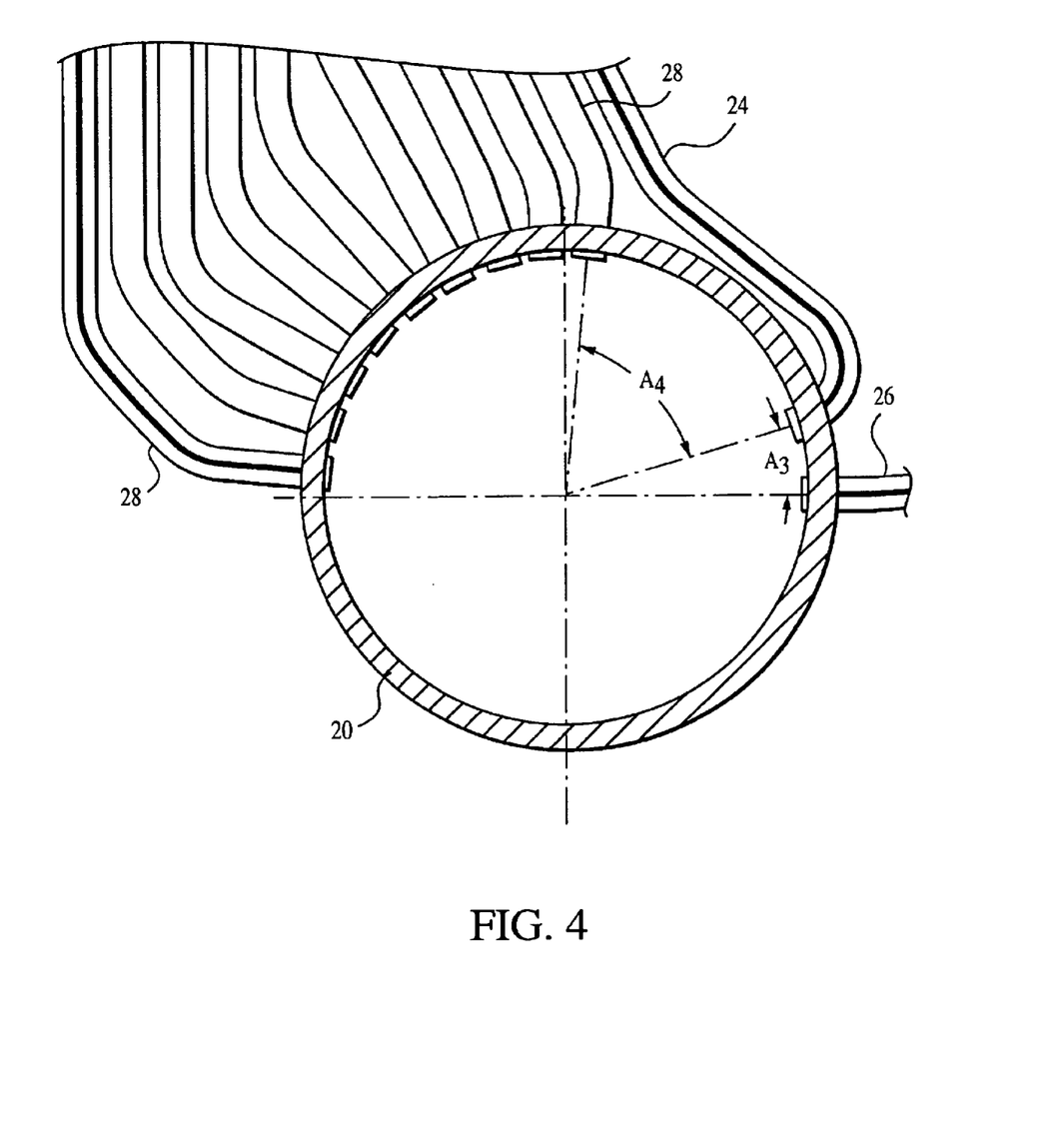
FIG. 4 is an enlarged view of the water drum as shown in FIG. 1.

At lower drum 20 the exits of the radiant tubes are similarly separated from the exits of the convection tubes. As shown in FIG. 4, the exits of inboard radiant tube 24 and outboard radiant tube 26 are at an angle $A_3$, while the exits of inboard radiant tube 24 and the nearest convection tube 28 are at an angle $A_4$. In the configuration depicted, $A_3$ is approximately 17 degrees, $A_4$ is approximately 68 degrees, and $A_3$ is approximately 25% of $A_4$.

As shown in FIG. 3, internal baffle 40, which is made of steel plates, extends substantially the length of steam drum 22 and defines beneath the baffle a zone or chamber 41 which includes the entrances of radiant tubes 24, 26 and convection tubes 28. Baffle 40 has screens 42 above the vertical midpoint of steam drum 22.

As shown in FIG. 2, the inboard radiant tubes 24 closest to rear end wall 18 do not have fins and thus define furnace exit passage 44 in baffle wall 32. End wall radiant tubes 46 exit water drum 20, extend generally horizontally across the floor of the furnace, just above outboard radiant tubes 26, and then extend vertically upward adjacent end wall 18 and enter steam drum 22. Burner opening 48 is in front end wall 16, and gas outlet 50 is in side wall 12. Also shown in FIG. 2 are steel outer casing 52, monobloc insulation 54, castable refractory 56, and expansion joints 58 packed with thermal ceramic insulation, which together constitute end walls 16, 18.

A burner (not shown) in burner opening 48 injects air and atomized fuel into combustion chamber 36, creating a flame extending horizontally in the radiant section, toward rear end wall 18. The combustion gases then pass through furnace exit passage 44, return in the opposite direction through the convection section toward front end wall 16, exit through gas outlet 50, and finally are discharged through a stack (not shown). The heat absorbed by the tubes boils water inside them to form steam. About 85% of the heat transfer occurs in the convection section, while more heat is transferred in a radiant tube 24, 26 than in a convection tube 28.

In the water and steam circuit, the steam formed in tubes 24, 26, 28, which may be visualized as bubbles of one size or another, creates buoyancy which causes the water and steam mixture in each tube to rise to steam drum 22. The higher the proportion of steam in a given tube, the greater the buoyancy, and the greater the velocity of the mixture flowing in that tube. Thus, the mixture entering steam drum 22 from a radiant tube 24 or 26 has a greater steam content and a higher velocity than the mixture entering from a convection tube 28. As the two-phase steam and water mixture enters steam drum 22, the steam is carried by buoyancy forces generally upward in chamber 41 until it reaches surface 59, shown in FIG. 3. It will be understood that the actual interface between the vapor-containing liquid and the liquid-containing vapor may be turbulent or even frothy, especially in chamber 41. For measurement and control purposes, the level of surface 59 is desirably kept at the vertical midpoint of steam drum 22.

The steam and water move lengthwise through steam drum 22, toward front end wall 16, to downcomer tubes 60. Within steam drum 22, the steam is separated from the water in a conventional manner, as described in *Steam/Its Generation and Use*, which is cited above, at pages 5-12 to 5-14, and *Combustion Fossil Power*, which is also cited above, at pages 5-25 to 5-35. Downcomer tubes 60 are substantially the same as convection riser tubes 28, but they are not covered by internal baffle 40 at their entrances to drum 22. In the embodiment depicted in FIG. 2, the left-most 135 tubes in the convection section are shown to be downcomer tubes 60. Water in downcomer tubes 60 returns by gravity to water drum 20. In this manner the water and steam naturally circulates and re-circulates in the pressure vessel defined by the drums and tubes, without a pump.

Returning now to the tube configuration as shown in FIG. 3, distance $D_2$ should be at least 60% of drum radius R so that inboard radiant tubes 24 are interposed between a substantial portion of steam drum 22 and the flame in combustion chamber 36. This has two advantages. First, inboard radiant tubes 24 "shield" the right half of drum 22 from direct radiation from the flame in combustion chamber 36. This reduces the temperature of the bottom of the drum and eliminates the need for insulation to perform the shielding function, which in turn increases longevity and reduces maintenance requirements. The second advantage, which is at least as important, is that the total heat transfer surface is increased, since inboard radiant tubes 24 have been lengthened, and since in a geometric sense the total surface area of the multiple tubes and fins is greater than that of the single drum. While the value of distance $D_2$ should be at least 60% of drum radius R in order to realize significant advantages, $D_2$ should preferably be at least 80% of R.

The configuration, function, and advantages of inboard radiant tubes 24 at water drum 20 are similar to those described in the preceding paragraph with respect to steam drum 22.

Distance $D_3$ should be substantially less than steam drum radius R, and preferably less than 70% of radius R, so as to maximize the height of combustion chamber 36. Since the exterior width and height of a package boiler are probably limited by transportation requirements, maximizing combustion chamber height accomplishes two objectives, without decreasing the heat transfer area of the tubes. First, the volume of the combustion chamber is increased. Second, the combustion chamber can be more square, which permits a more uniform flame, which in turn increases efficiency, facilitates control, and reduces NOx emissions.

The spacing of the entrances of radiant tubes 24, 26 and convection tubes 28 into steam drum 22, as shown in FIG. 3, accomplishes several interrelated objectives. First, a greater percentage of the volume of chamber 41 is allocated to the steam vapor flowing at a higher volume and greater velocity from radiant tubes 24, 26, as opposed to that flowing from convection tubes 28. Second, the generally upward flow of the two-phase mixture in chamber 41 is made smoother, more uniform, and less turbulent. Third, since the mixture is being stirred less vigorously, the entrained steam vapor is more readily and quickly separated from it, which results in dryer steam leaving steam drum 22.

The spacing of the entrances also enhances safety and control, for the following reasons. Generally speaking, foamy, turbulent mixtures containing large volumes of vapor would cause the surface of the water in a steam drum to be higher than the actual liquid volume would indicate if the vapor bubbles were not elevating it. A high water level that contains large volumes of vapor does not provide the necessary reserve of liquid water mass to absorb heat during an emergency shutdown. Such an emergency might be caused by the failure of the boiler feedwater supply system, for example. The foamy mixture in the drum slumps as the flow rate slows from feedwater stoppage and/or from evaporation rate slowing. Boiler safety systems provide for an alarm and shutdown if the water level drops too low. A drum water level which indicates safe depths of water, while actually the water beneath is mostly vapor vigorously mixed into the liquid, is unsafe, because the water fraction can contain insufficient heat absorption capacity to completely absorb the system heat before the pressure parts become overheated and damaged. In prior art tube configurations in which the radiant riser tubes are closely spaced adjacent convective riser tubes, the entire zone of drum water is stirred by the adjacent flows, causing steam vapor to remain mixed in the water, thereby increasing the mixture volume without allowing room for water mass. In contrast, the present invention, by minimizing foaming and turbulence in the two-phase steam and water mixture in steam drum 22, avoids reduced water mass below water level 59 in steam drum 22 and reduces the possibility of false water levels that could lead to system damage.

To achieve the enhanced performance for steam drum 22 just described, as well as the shielding and increase in heat transfer surface area described earlier, angle $A_2$ should be substantially greater than angle $A_1$. Preferably angle $A_2$ should be at least 20 degrees or 200% of angle $A_1$. For best performance $A_2$ should be at least 35 degrees or 350% of angle $A_1$. The same applies to water drum 20, for reasons of shielding and heat transfer surface increase, with $A_3$ substituted for $A_1$ and $A_4$ substituted for $A_2$.

The center of gravity of boiler 10 is at the midpoint of its width, equidistant from the outer surfaces of side walls 12, 14. This is the result of design and calculations which position steam drum 22, the heaviest component of the system, away from side wall 14 (i.e., not as close as possible to side wall 14, but in the opposite direction), so that its longitudinal axis is spaced from the vertical plane including side wall 14 by distance $D_1$. The ability to position steam drum 22 merely by selecting $D_1$, without sacrificing heat transfer surface area, is made possible by the above-described configuration of inboard radiant tube 24. We believe that the prior art does not disclose a package water tube boiler having two offset drums and a lateral center of gravity equidistant from the exterior surfaces of its side walls.

Steam drum 22 is fixed to and supported by the structure of end walls 16, 18, rather than being supported by tubes 24, 26, 28, which is possible because of the configuration of the tubes. All of the tubes are relatively long, and none of them has a vertical run directly under steam drum 22. Making steam drum 22 an element of the structure of boiler 10, rather than supported by the tubes themselves, reduces the load on the tubes, eliminates their supporting capacity as a design factor, and strengthens boiler 10 as a unit for purposes of transportation and longevity. We believe that the prior art does not disclose such "top mounting" of a steam drum in a package water tube boiler having two offset drums, because such in such prior art boilers the steam drum is supported by the tubes themselves so that the drum may move up and down to accommodate thermal expansion of the tubes. The tube configuration according to the present invention allows the tubes to flex both (1) as an entire array of tubes and (2) as one tube expands more or less than another tube. This avoids thermal stresses on the tubes and on their connections to the drums.

The particular boiler described herein is fueled by natural gas or fuel oil and has a capacity to generate 25,000 pounds per hour of steam. It will be understood, however, that boilers according to the invention may be fueled by various other fuels, and may have a capacity ranging from about 10,000 to about 300,000 pounds per hour.

A hot water generating boiler according to the invention will be similar to the steam generating boiler described above, except that the upper drum will be a hot water drum rather than a steam-and-water drum and will have not have an internal baffle or any other device for separating steam and water.

While the particular boiler described herein utilizes membrane wall tubes, it will be understood that studded or tangent tubes could also be used.

It will also be understood that, while presently preferred embodiments of the invention have been illustrated and described, the invention is not limited thereto, but may be otherwise variously embodied within the scope of the following claims.

What is claimed is:

1. A package, two-drum, water tube boiler comprising:
   (a) a first side wall, a second side wall, and two end walls disposed in a rectangular configuration, the side walls being substantially longer than the end walls;
   (b) a cylindrical, lower, water drum adjacent to, and having its longitudinal axis parallel to, the bottom of the first side wall;
   (c) a cylindrical upper, steam drum adjacent to, and having its longitudinal axis parallel to, the top of the second side wall;
   (d) a combustion chamber located generally between the drums, for containing a flame extending parallel to the axes of the drums;
   (e) riser tubes connecting the lower drum to the upper drum so as to permit water, saturated steam, and mixtures thereof to flow from the lower drum to the upper drum, which riser tubes comprise
      (i) first, inboard radiant tubes extending from exits in the lower drum, upward in a vertical run along the side of the combustion chamber which is closer to the first side wall, then laterally toward the second side wall in a generally horizontal run along the top of the combustion chamber at a height below the upper drum and passing through a vertical plane which includes the upper drum's longitudinal axis, and then to entrances in the upper drum;
      (ii) second, outboard radiant tubes extending from exits in the lower drum, laterally toward the second side wall in a generally horizontal run along the bottom of the combustion chamber, then upward in a vertical run along the other side of the combustion chamber, and then to entrances in the upper drum;
      (iii) a bank of convection tubes extending from exits in the lower drum, upward in a vertical run adjacent the vertical run of the inboard radiant tubes, then laterally in a generally horizontal run above the generally horizontal run of the inboard radiant tubes, and then to entrances in the upper drum;

(f) wherein the inboard radiant tubes in their generally horizontal run extend past said vertical plane by a distance equal to at least 60% of the radius of the upper drum and then bend upward and away from the second side wall before entering the upper drum.

2. A boiler according to claim 1 wherein the inboard radiant tubes, just before entering the upper drum, bend in an acute angle.

3. A boiler according to claim 1 wherein the inboard radiant tubes in their generally horizontal run extend sufficiently close to the second side wall as to shield the drum from substantially all of the flame in the combustion chamber.

4. A boiler according to claim 1 wherein the entrances in the upper drum are spaced so that the distance between each inboard radiant tube entrance and the nearest outboard radiant tube entrance is substantially less than the distance between that inboard radiant tube entrance and the nearest convection tube entrance.

5. A boiler according to claim 1 wherein the entrances in the upper drum are spaced so that each inboard radiant tube entrance is at least 20 degrees from the nearest convection tube entrance.

6. A boiler according to claim 1 wherein no convection tube passes through said vertical plane.

7. A boiler according to claim 1 wherein, in said vertical plane, the distance between the lower surfaces of the inboard radiant tubes and the bottom of the upper drum is substantially less than the radius of the upper drum.

8. A boiler according to claim 1 wherein said vertical plane is spaced from the vertical plane including the exterior surface of the second side wall by a distance sufficient to place the center of gravity of the boiler equidistant from the first side wall and the second side wall.

9. A boiler according to claim 1 wherein the steam drum is fixed to and supported by the end walls.

10. A package, two-drum, water tube boiler comprising:
    (a) a first side wall, a second side wall, and two end walls disposed in a rectangular configuration, the side walls being substantially longer than the end walls;
    (b) a cylindrical, lower, water drum adjacent to, and having its longitudinal axis parallel to, the bottom of the first side wall;
    (c) a cylindrical upper, steam drum adjacent to, and having its longitudinal axis parallel to, the top of the second side wall;
    (d) a combustion chamber located generally between the drums, for containing a flame extending parallel to the axes of the drums;
    (e) riser tubes connecting the lower drum to the upper drum so as to permit water, saturated steam, and mixtures thereof to flow from the lower drum to the upper drum, which riser tubes comprise
        (i) first, inboard radiant tubes extending from exits in the lower drum, upward in a vertical run along the side of the combustion chamber which is closer to the first side wall, then laterally toward the second side wall in a generally horizontal run along the top of the combustion chamber at a height below the upper drum and passing through a vertical plane which includes the upper drum's longitudinal axis, and then to entrances in the upper drum;
        (ii) second, outboard radiant tubes extending from exits in the lower drum, laterally toward the second side wall in a generally horizontal run along the bottom of the combustion chamber, then upward in a vertical run along the other side of the combustion chamber, and then to entrances in the upper drum;
        (iii) a bank of convection tubes extending from exits in the lower drum, upward in a vertical run adjacent the vertical run of the inboard radiant tubes, then laterally in a generally horizontal run above the generally horizontal run of the inboard radiant tubes, and then to entrances in the upper drum;
    (f) wherein, in said vertical plane, the distance between the lower surfaces of the inboard radiant tubes and the bottom of the upper drum is substantially less than the radius of the upper drum.

11. A boiler according to claim 10 wherein the inboard radiant tubes in their generally horizontal run extend sufficiently close to the second side wall as to shield the drum from substantially all of the flame in the combustion chamber.

12. A boiler according to claim 10 wherein said vertical plane is spaced from the vertical plane including the exterior surface of the second side wall by a distance sufficient to place the center of gravity of the boiler equidistant from the first side wall and the second side wall.

13. A boiler according to claim 10 wherein the steam drum is fixed to and supportee by the end walls.

14. A package, two-drum, water tube boiler comprising:
    (a) a first side wall, a second side wall, and two end walls disposed in a rectangular configuration, the side walls being substantially longer than the end walls;
    (b) a cylindrical, lower, water drum adjacent to, and having its longitudinal axis parallel to, the bottom of the first side wall;
    (c) a cylindrical upper, steam drum adjacent to, and having its longitudinal axis parallel to, the top of the second side wall;
    (d) a combustion chamber located generally between the drums, for containing a flame extending parallel to the axes of the drums;
    (e) riser tubes connecting the lower drum to the upper drum so as to permit water, saturated steam, and mixtures thereof to flow from the lower drum to the upper drum, which riser tubes comprise
        (i) first, inboard radiant tubes extending from exits in the lower drum, upward in a vertical run along the side of the combustion chamber which is closer to the first side wall, then laterally toward the second side wall in a generally horizontal run along the top of the combustion chamber at a height below the upper drum and passing through a vertical plane which includes the upper drum's longitudinal axis, and then to entrances in the upper drum;
        (ii) second, outboard radiant tubes extending from exits in the lower drum, laterally toward the second side wall in a generally horizontal run along the bottom of the combustion chamber, then upward in a vertical run along the other side of the combustion chamber, and then to entrances in the upper drum;
        (iii) a bank of convection tubes extending from exits in the lower drum, upward in a vertical run adjacent the vertical run of the inboard radiant tubes, then laterally in a generally horizontal run above the generally horizontal run of the inboard radiant tubes, and then to entrances in the upper drum;
    (f) wherein said vertical plane is spaced from the vertical plane including the exterior surface of the second side wall by a first distance, and the inboard radiant tubes in their generally horizontal run extend past said vertical plane by a second distance, the sum of which first and second distances is sufficient to place the center of gravity of the boiler equidistant from the outer surfaces of the first and second side walls.

15. A boiler according to claim 14 wherein the inboard radiant tubes in their generally horizontal run extend sufficiently close to the second side wall as to shield the drum from substantially all of the flame in the combustion chamber.

16. A boiler according to claim 14 wherein, in said vertical plane, the distance between the lower surfaces of the inboard radiant tubes and the bottom of the upper drum is substantially less than the radius of the upper drum.

17. A boiler according to claim 14 wherein said vertical plane is spaced from the vertical plane including the exterior surface of the second side wall by a distance sufficient to place the center of gravity of the boiler equidistant from the first side wall and the second side wall.

18. A boiler according to claim 14 wherein the steam drum is fixed to and supported by the end walls.

* * * * *